Oct. 2, 1934.  J. C. HEINTZ  1,975,149
METHOD OF REPAIRING TIRES
Filed May 13, 1932
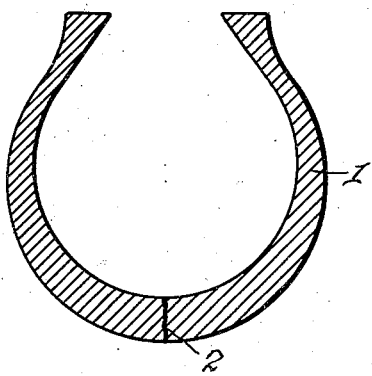
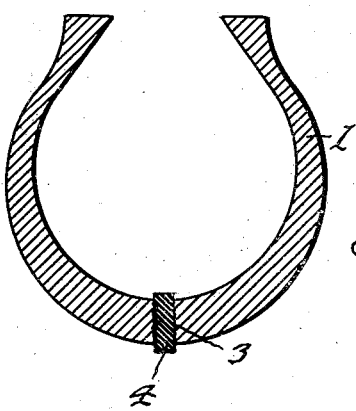
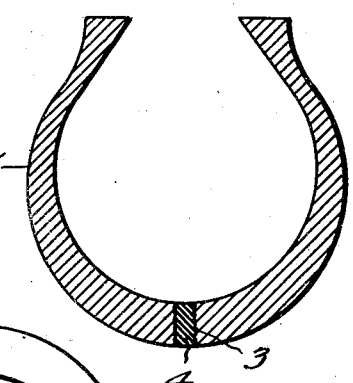
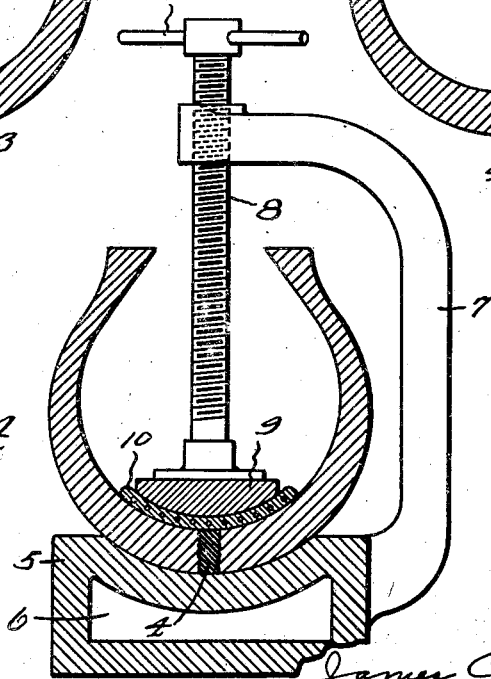
Inventor
James C. Heintz
By Hull, Brock & West
Attorney Patented Oct. 2, 1934

1,975,149

UNITED STATES PATENT OFFICE 1,975,149

METHOD OF REPAIRING TIRES

James C. Heintz, Lakewood, Ohio

Application May 13, 1932, Serial No. 611,175

1 Claim. (Cl. 18—59)

This invention relates to a method and apparatus for repairing rubber tires for automotive vehicles.

The main object of the invention is to provide a method of repairing punctures in tire casings which is simple and efficient and which can be carried out with a minimum amount of equipment.

A further object of the invention is to provide a method of sealing against entrance of moisture, the common punctures in pneumatic rubber tires in which the opening in the tire casing is filled with rubber or other suitable material and the tire then vulcanized by applying heat to both the inside and the outside of the tire. This invention is especially adapted to the repairing of nail holes and other minor injuries in the outer casings of pneumatic tires, where the extent of the injury has not seriously weakened the fabric structure of the tire. Such injuries in the past have either been totally neglected or have been inadequately repaired with the result of premature failure of the tire casing, along with the pinching and destruction of the tire tube.

Further and more limited objects of the invention will appear as the description proceeds and by reference to the accompanying drawing in which Fig. 1 is a vertical sectional view of a tire which has been punctured; Fig. 2 is a view similar to Fig. 1 showing the opening after it has been enlarged and filled with a slug of rubber; Fig. 3 is a view similar to Fig. 2 disclosing the tire just before being vulcanized; and Fig. 4 is a fragmentary sectional view disclosing the manner of applying heat to both the interior and exterior of the tire for vulcanizing the repair.

Heretofore it has been customary to repair punctures in tires by repairing the inner tube only without proper treatment of the tire casing. Where any attempt has been made to repair the casing the repair has been in the form of a prevulcanized plug or a reinforcement over the injury and which did not properly seal the puncture against entry of moisture and against the effect of chafing of the tire casing or tube. In my method, no reinforcement of the tire fabric structure is necessary.

In order to overcome these difficulties, I have provided a new and improved method of repairing punctures in tires which consists essentially in enlarging the opening about the puncture and then filling the opening with a slug or plug of soft, raw rubber, gum or the like which will vulcanize at a low temperature, and then applying heat and pressure to the area adjacent to and surrounding the puncture until complete vulcanization is effected.

In Fig. 1 I have disclosed a tire 1 having a puncture 2 therein. In carrying out my method I first enlarge the opening 2 with a suitable boring tool which provides an opening 3 the surface of which is somewhat roughened or irregular. I then insert into this opening, by means of any suitable tool, a quantity of raw rubber or gum 4, preferably in the form of a slug or roll which is of such size as to slightly distend the walls of the opening and is slightly longer than the opening. The projecting ends are then trimmed off and the tire placed in a mold 5 which is shaped as shown most clearly in Fig. 4 and provided with an opening 6 which contains a suitable heating means either electric or steam. The mold is provided with an overhanging bracket 7 through which is threadedly secured a stem or rod 8 to the lower end of which is secured a pressure plate 9. Disposed within the tire is a suitable heating pad 10 which may be heated either electrically or by steam. The stem or rod 8 is provided with a handle 11 by means of which the screw or rod 8 is tightened to apply pressure to the portion of the tire to be repaired.

It will thus be seen that heat will be applied to both the interior and the exterior of the tire adjacent the puncture. The heat and pressure are applied for a sufficient period of time to cause complete vulcanization. The tire may then be removed from the mold and is ready for use. The opening in the tire is effectively sealed and prevents the entry of moisture or the like into the puncture. A tire repaired in this manner will have practically as long life as a new tire.

As a modification of my method, I may insert into the opening a plug of rubber, gum or the like which is slightly smaller than the opening and to which has been applied a layer or coating of soft rubber gum, rubber cement or the like and then apply heat and pressure as hereinbefore described. It will be noted that when vulcanized, the plug is approximately flush with the adjacent parts of the tire.

It will now be clear that I have provided a method and apparatus for repairing tires which will accomplish the objects of the invention as hereinbefore stated. Throughout the specification I have used the term "puncture" to refer to a rather small opening such as is produced by a nail passing through the tire as distinguished from a break or "blow-out" in the walls of the tire which requires repairs to the tire carcass and which can be repaired in a manner well known to those skilled in the art. Various changes may be made in the details of the apparatus used without departing from the spirit of my invention, and the embodiment of the invention herein disclosed is merely illustrative and is not to be considered in a limiting sense as the invention is limited only in accordance with the scope of the appended claims.

Having thus described my invention, what I claim is:

The method of repairing punctures in tires which consists in enlarging the opening about the puncture and roughening the surface thereof, forcing into the opening a slug of rubber which will vulcanize at a low temperature and which is substantially circular in shape and large enough to distend the opening slightly, and then applying heat and pressure to the opposite ends of the slug for a sufficient period of time to cause vulcanization.

JAMES C. HEINTZ.